(12) United States Patent
Greene

(10) Patent No.: US 7,596,434 B2
(45) Date of Patent: Sep. 29, 2009

(54) AIRCRAFT BRAKE TEMPERATURE MONITORING SYSTEM AND METHOD

(75) Inventor: Leonard M. Greene, Mamaroneck, NY (US)

(73) Assignee: Safe Flight Instrument Corporation, White Plains, NY (US)

( * ) Notice: Subject to any disclaimer, the term of this patent is extended or adjusted under 35 U.S.C. 154(b) by 928 days.

(21) Appl. No.: 11/111,920

(22) Filed: Apr. 22, 2005

(65) Prior Publication Data

US 2006/0241819 A1 Oct. 26, 2006

(51) Int. Cl.
*B64C 25/68* (2006.01)
*E01C 11/00* (2006.01)
*G06F 19/00* (2006.01)

(52) U.S. Cl. .............................. 701/29; 701/3; 701/15; 244/110 A

(58) Field of Classification Search ...... 701/3, 701/29, 70, 15; 244/110 A, 111, 114 R; 188/382, 188/1.11 E; 340/959
See application file for complete search history.

(56) References Cited

U.S. PATENT DOCUMENTS

| | | | | |
|---|---|---|---|---|
| 5,845,975 A | * | 12/1998 | Wells | 303/126 |
| 5,982,300 A | * | 11/1999 | Greene | 340/959 |
| 6,478,252 B1 | * | 11/2002 | Stimson et al. | 244/111 |
| 6,659,233 B2 | * | 12/2003 | DeVlieg | 188/1.11 E |

* cited by examiner

*Primary Examiner*—Tan Q Nguyen
(74) *Attorney, Agent, or Firm*—Cohen Pontani Lieberman & Pavane LLP

(57) ABSTRACT

An aircraft's brake temperature monitoring system for determining when the brake has cooled sufficiently for a safe take-off includes an aircraft brake and a temperature sensor for measuring the temperature of the brake. The system also includes a timer and indicator for indicating the brake temperatures at two different times. A computer or circuit for calculating the rate of cooling is provided and determines the time until the brakes reach a preselected temperature. An electronically stored temperature profile and ambient temperature sensor are also provided.

9 Claims, 2 Drawing Sheets

AIRCRAFT BRAKE TEMPERATURE MONITORING SYSTEM AND METHOD

FIELD OF THE INVENTION

This invention relates to an aircraft brake temperature monitoring system and method and more particularly to an aircraft brake temperature monitoring system and method for determining the time interval until a safe take-off can be initiated.

BACKGROUND FOR THE INVENTION

Problems associated with high brake temperatures which can cause brake failure if the brakes are continually used at such temperatures are well known. Such problems are particularly serious in the field of aviation. For example, when a heavy commercial jetliner lands it takes tremendous energy to stop and much if not most of the energy is converted into heat which raises the temperature of the brakes.

In view of the heat buildup and the potential for brake failure, the aircraft is required to stay on the ground for a period of minutes or even one or two hours to allow the brakes to cool. For safety, it is mandated that the brakes must be capable of bringing the aircraft to a full stop in the event of an aborted take-off that occurs at the last minute. Such stops put tremendous demands on an aircraft's brakes and can raise the temperature of the brakes to critical levels. Therefore, if the brakes had not been sufficiently cooled after a landing, they could fail under the demands of an aborted take-off.

It is now believed that there may be a commercial market for an improved aircraft brake temperature monitoring system and method in accordance with the present invention. There should be a demand for such systems which accurately determine the time interval until the brakes reach a temperature that make it safe to take-off in the aircraft. In this way, some aircraft could obtain a faster turn around and have an ability to makeup for lost time on a previous leg and at the same time avoid a potentially dangerous condition.

Further, it is believed that the systems in accordance with the present invention will be relatively inexpensive to manufacture and install, durable, reliable and facilitate servicing such units.

BRIEF SUMMARY OF THE INVENTION

In essence, the present invention contemplates an aircraft brake temperature monitoring system for determining the time interval until a safe take-off can be initiated. The system includes an aircraft brake or brakes and a temperature sensor for sensing the temperature of a brake or brakes after the aircraft is brought to a stop. A timer and means including the sensor and the timer are provided for measuring the temperature of the brake or brakes at two different times. The system also includes means for calculating the rate of cooling of the brake and for determining the time until the brake reaches a safe take-off temperature.

A preferred embodiment of the invention includes an ambient temperature sensor and electronic storage means for storing a temperature profile for brake cooling at various ambient temperatures. Means are also provided for comparing the rate of cooling with the temperature profile for a given ambient temperature to determine the time until a safe take-off temperature is reached.

The invention also contemplates a method for determining the time interval until an aircraft brake has cooled to a safe take-off temperature. The method includes the step of providing an aircraft brake, a temperature sensor for sensing the temperature of the brake, a timer and a temperature profile which is indicative of the rate of cooling of a brake following the landing of the aircraft.

After landing, the brakes are activated and the aircraft is brought to a stop. After the aircraft is stopped, the temperature of the brake is sensed or measured and after a preselected period of time the temperature of the brake is again recorded. From these recorded times the rate of cooling is calculated and compared to the temperature or cooling profile to determine the time needed for the brake to reach a predetermined temperature for a safe take-off i.e., when the brakes are cool enough to bring the aircraft to a stop from an aborted take-off which occurs just before lift-off.

In a preferred embodiment of the method, the ambient temperature is inputted into the calculation of the cooling rate and an electronic storage includes a temperature profile for a range of ambient temperatures. Then, the calculated rate of cooling is matched with the temperature profile for the existing ambient temperature and the time to reach a preselected brake temperature is determined.

The invention will now be described in connection with the accompanying drawings.

DESCRIPTION OF THE PREFERRED EMBODIMENTS OF THE INVENTION

Figure 1:
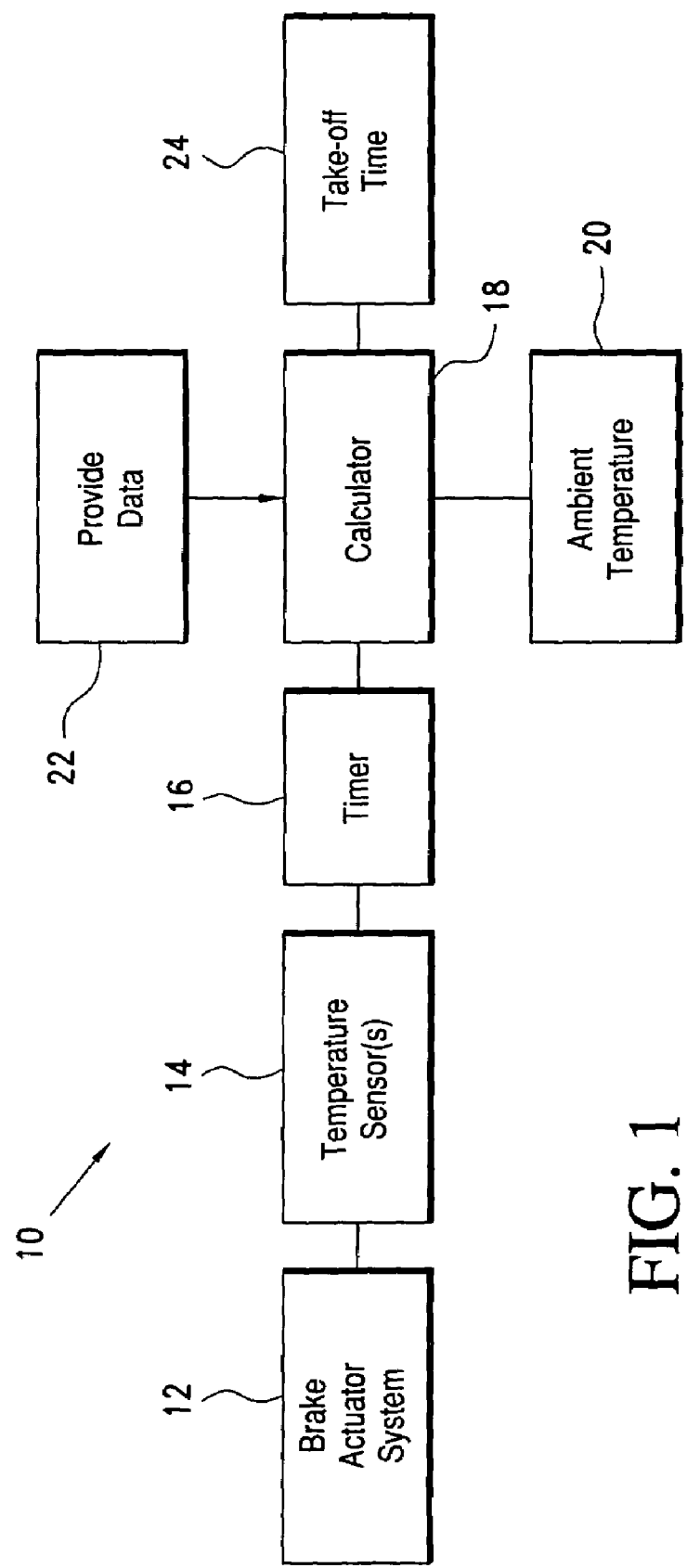
FIG. 1 is a schematic block diagram which illustrates a first embodiment of the invention.

As illustrated in FIG. 1, an aircraft brake temperature monitoring system 10 for determining the time until a safe take-off temperature is reached includes a brake actuating system 12. The brake actuating system and brakes (not shown) are conventional. The system also includes a temperature sensor or sensors 14 for sensing the temperature of the brake and a timer 16 which is used to determine a time interval between two temperature readings or indications.

The signals from the temperature sensors indicate the temperature of the brake or brakes after the stopping of the aircraft and after a preselected time. These signals are fed to a calculator 18 such as a computer or electrical circuit and the rate of cooling is calculated. The computer through a computer program or electrical circuit is of conventional design and well within the ability of a person of ordinary skill in the art. Accordingly, it is not described in further detail herein.

Signals indicative of the normal rate of cooling at various ambient temperatures over a normal range of operations i.e., temperature profiles are inputted into an electronic storage means 22, which is labeled "provide data." An additional signal indicative of the sensed ambient temperature is fed to the calculator 18 from an ambient temperature sensor 20. Then a signal indicative of the normal rate of cooling at the same ambient temperature is entered into the calculator 18 from the storage means 22. The computer then compares the actual cooling rate and the sensed ambient temperature with the normal cooling rate at the same ambient temperature. The calculator 18 then computes the time remaining for sufficient cooling to a temperature at which it is safe to initiate take-off and outputs the time remaining to an indicator 24.

Figure 2:
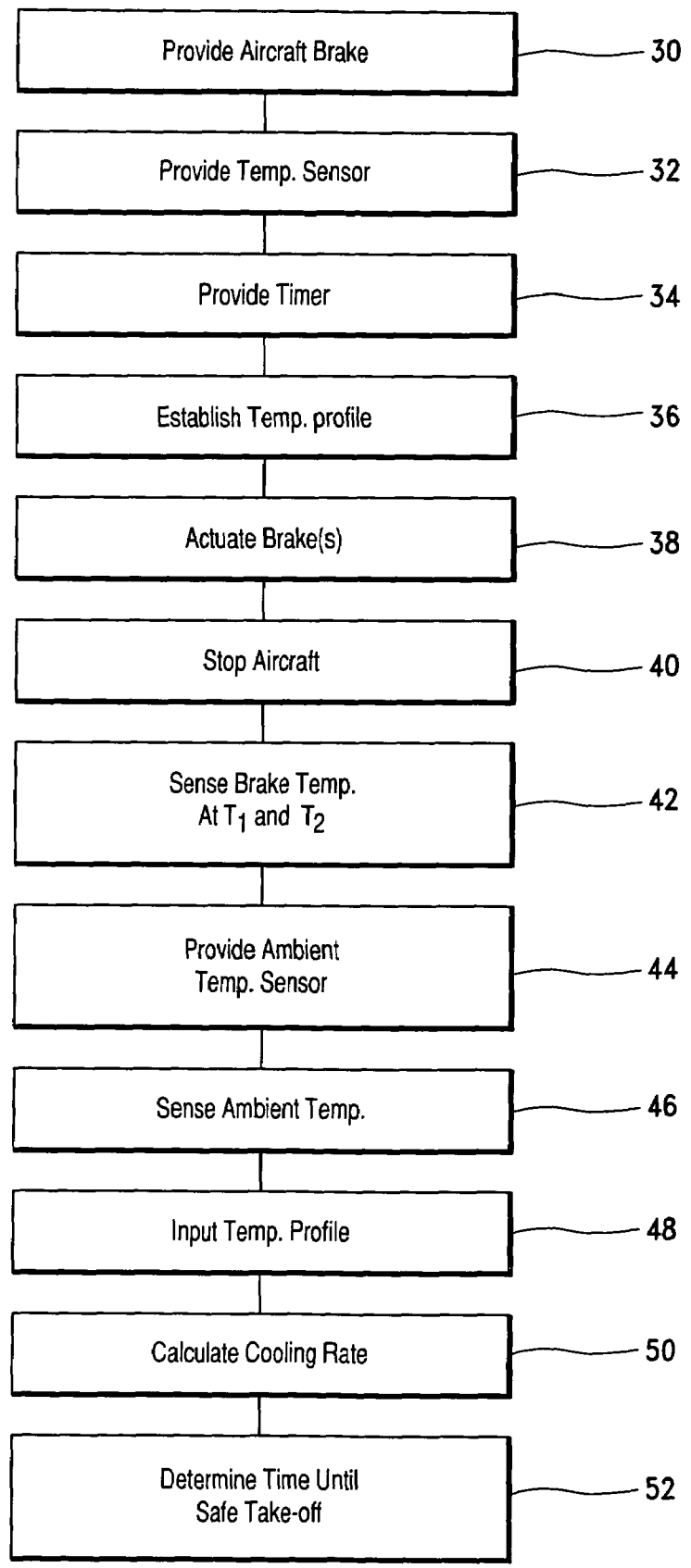
FIG. 2 is a flowchart which illustrates a method in accordance with a second embodiment of the present invention.

A method in accordance with a second embodiment of the invention is illustrated in FIG. 2 and includes the steps of providing an aircraft brake or brakes 30, a temperature sensor 32 and a timer 34. The method also includes the step of establishing a temperature profile, which is indicative of the cooling of the brake at various ambient temperatures. Such profiles can be established by testing and/or calculation and are stored in electronic format in a computer or the like in a conventional manner.

After landing the aircraft, a pilot actuates the brakes in step 38 and brings the aircraft to a stop in step 40 in a conventional manner. After stopping the aircraft, the pilot senses the brake temperature, which is input into a computer and then after a preselected interval of time measures the brake temperature again and inputs it into the computer. The method in accordance with the invention also includes the steps of providing an ambient temperature sensor 44 and sensing the ambient temperature in step 46. Further, the method includes the step of inputting a temperature profile for the sensed ambient temperature from step 44 and profile 48 and calculates the cooling rate in step 50. The output is then sent to a indicator 52 which determines the time until a safe take-off can be initiated.

While the invention has been described in connection with its preferred embodiments, it should be recognized that changes and modifications may be made therein without departing from the scope of the appended claims.

What is claimed is:

1. An aircraft brake temperature monitoring system for determining the time interval until a safe take-off can be initiated, said system comprising an aircraft brake and a temperature sensor for measuring the temperature of said brake, a timer coupled said sensor and said timer for measuring the temperature of said brake at two selected times, and means for calculating the rate of cooling of said brakes and for determining the time until the brake reaches a preselected safe take-off temperature.

2. An aircraft brake temperature monitoring system for determining the time interval until a safe take-off can be initiated according to claim 1, which includes means for sensing the ambient temperature and in which said means for calculating the rate of cooling of said brakes includes the effect of ambient temperature thereon.

3. An aircraft brake temperature monitoring system for determining the time interval until a safe take-off can be initiated according to claim 2, which includes an electronically stored temperature profile and means for comparing the calculated rate of cooling with said electronically stored temperature profile to determine a time until the brake reaches a safe take-off temperature.

4. An aircraft brake temperature monitoring system for determining the time interval until a safe take-off can be initiated according to claim 3, in which said brake monitoring system is applied to each of the brakes on an aircraft.

5. A system for determining the time interval until an aircraft's brakes have cooled to a safe take-off temperature comprising:
a brake assembly including a frictional brake surface and a brake pad for stopping an aircraft following a landing;
a sensor for sensing the temperature of said brake assembly after the aircraft has come to a stop and the brake has been released;
a timer; means coupled to said sensor and said timer for measuring the temperature of said brake assembly at two times; and
means for calculating the rate of cooling of said brake assembly and for determining the time until the brake assembly reaches a safe take-off temperature.

6. A system for determining the time interval until an aircraft's brakes have cooled to a safe take-off temperature according to claim 5, which includes means for sensing the ambient temperature and in which said means for calculating the rate of cooling of said brake assembly includes the effect of ambient temperature.

7. system for determining the time interval until an aircraft's brakes have cooled to a safe take-off temperature according to claim 5, which includes an electronically stored temperature profile and means for comparing the calculated rate of cooling with said electronically stored temperature profile to determine a time until the brake reaches a safe take-off temperature.

8. A method for determining the time interval until an aircraft's brakes have cooled to a safe take-off temperature comprising the steps of:
providing an aircraft brake, a temperature sensor for sensing the temperature of the brakes, a timer and a temperature profile indicative of the cooling of the brake;
actuating the brake after landing the aircraft and bringing the aircraft to a stop;
sensing the temperature of the aircraft's brake at two different times;
calculating the rate of cooling; and
determining the time when the aircraft brake will have cooled sufficiently for a safe take-off.

9. A method for determining the time interval until an aircraft's brakes have cooled to a safe take-off temperature according to claim 8, which includes the step of inputting the ambient temperature and including the ambient temperature and calculating the rate of cooling.

* * * * *